US012232648B2

(12) United States Patent
Klein

(10) Patent No.: US 12,232,648 B2
(45) Date of Patent: Feb. 25, 2025

(54) TOASTER AND CONVECTION OVEN WITH VARIABLE CONTROLS

(71) Applicant: Andrew J. Klein, Westport, CT (US)

(72) Inventor: Andrew J. Klein, Westport, CT (US)

(73) Assignee: Conair Corporation, Stamford, CT (US)

( * ) Notice: Subject to any disclaimer, the term of this patent is extended or adjusted under 35 U.S.C. 154(b) by 643 days.

(21) Appl. No.: 14/447,885

(22) Filed: Jul. 31, 2014

(65) Prior Publication Data

US 2016/0029829 A1 Feb. 4, 2016

(51) Int. Cl.
*A47J 37/08* (2006.01)
*A47J 37/06* (2006.01)

(52) U.S. Cl.
CPC ........... *A47J 37/0641* (2013.01); *A47J 37/08* (2013.01)

(58) Field of Classification Search
CPC ........ A47J 27/62; A47J 37/06; A47J 37/0641; A47J 37/08; A47J 37/0871; A47J 37/0629; A47J 37/0658; A47J 37/0676; F24C 7/00; F24C 7/04; F24C 7/085; F24C 7/043; F24C 7/046; F24C 7/08; F24C 7/081; F24C 7/082; F24C 7/086; F24C 7/087; F24C 7/088
USPC ....... 219/395, 396, 398, 401, 402, 412, 473; 99/324, 325, 326, 327, 331, 332, 340, 99/467, 468; 426/231, 233, 510, 511, 426/523
See application file for complete search history.

(56) References Cited

U.S. PATENT DOCUMENTS

| 4,332,992 | A | * | 6/1982 | Larsen ................. H05B 6/6435 |
| | | | | 126/21 A |
| 4,345,145 | A | | 8/1982 | Norwood |
| 4,386,558 | A | | 6/1983 | Holman et al. |
| 4,481,396 | A | | 11/1984 | Matsubayashi et al. |
| 4,829,158 | A | | 5/1989 | Burnham |
| 5,558,793 | A | | 9/1996 | McKee et al. |
| 5,607,611 | A | * | 3/1997 | Lee .......................... G01D 5/25 |
| | | | | 200/13 |
| 6,069,344 | A | | 5/2000 | Krasznai et al. |
| 6,080,963 | A | * | 6/2000 | Cardillo .............. A47J 37/0857 |
| | | | | 219/391 |
| 6,114,663 | A | | 9/2000 | Stockley |
| 6,114,664 | A | | 9/2000 | Cook et al. |
| 6,781,097 | B2 | | 8/2004 | Graff |
| 6,809,301 | B1 | * | 10/2004 | McIntyre ................ F24C 7/082 |
| | | | | 219/492 |

(Continued)

*Primary Examiner* — Hung D Nguyen
(74) *Attorney, Agent, or Firm* — Grogan, Tuccillo & Vanderleeden, LLP

(57) ABSTRACT

A toaster and convection oven includes a housing having an internal heating compartment, a heating mechanism in thermal communication with the heating compartment and configured to heat the heating compartment, a user interface including a plurality of user controls to be manipulated by a user, the user controls allowing the user to program a dual cook mode including a first cooking mode and a second cooking mode, and a control unit operatively connected to the user interface and to the heating mechanism. The control unit is configured to receive a signal from the user interface and to control operation of the heating mechanism in dependence upon the signal to run the first cooking mode and the second cooking mode sequentially without further input from the user.

13 Claims, 5 Drawing Sheets

(56) References Cited

U.S. PATENT DOCUMENTS

| | | | |
|---|---|---|---|
| D587,959 S | 3/2009 | Hensel | |
| 8,042,533 B2 | 10/2011 | Dobie et al. | |
| 8,136,442 B2 * | 3/2012 | Strutin-Belinoff | F24C 7/082 219/720 |
| D662,759 S | 7/2012 | Blacken et al. | |
| 2003/0047553 A1 * | 3/2003 | Patti | F24C 7/082 219/400 |
| 2003/0127451 A1 * | 7/2003 | Lile | A47J 37/06 219/506 |
| 2006/0047344 A1 * | 3/2006 | Head | F24C 7/082 700/1 |
| 2010/0006558 A1 * | 1/2010 | McLoughlin | F24C 7/08 219/392 |
| 2010/0006561 A1 * | 1/2010 | Hensel | A47J 37/0635 219/483 |
| 2010/0102995 A1 * | 4/2010 | Head | H03M 11/12 341/22 |
| 2012/0192850 A1 | 8/2012 | Hensel et al. | |
| 2012/0192851 A1 | 8/2012 | Hensel et al. | |
| 2014/0157994 A1 * | 6/2014 | Ryan | A47J 44/00 99/332 |

* cited by examiner

TOASTER AND CONVECTION OVEN WITH VARIABLE CONTROLS

FIELD OF THE INVENTION

The present invention relates to toaster ovens and, more particularly, to a toaster and convection oven that is selectively operable in a variety of modes.

BACKGROUND OF THE INVENTION

Various toaster ovens exist for heating and cooking a variety of food items. For example, existing toaster ovens are used for toasting bagels, heating sandwiches, baking desserts, broiling meats and reheating leftovers. Heating and cooking these food items is often accomplished by the operation of upper and lower heating elements within the toaster oven, and temperature control and time control over these heating elements through a user interface or control panel.

While existing toaster ovens are generally suitable for what is regarded as ordinary performance, there is room for improvement in terms of ease of use and performance, including more precise control of the cooking operation. In particular, existing toaster ovens are only particularly suited to toast or bake certain food items and are only temperature and time controllable to a limited extent.

SUMMARY OF THE INVENTION

It is an object of the present invention to provide a toaster and convection oven.

It is an object of the present invention to provide a toaster and convection oven having multiple pre-programmed operating modes.

It is an object of the present invention to provide a toaster and convection oven that has preset and adjustable temperature and cook times.

It is an object of the present invention to provide a toaster and convection oven that is programmable to cook in multiple sequential modes.

It is an object of the present invention to provide a toaster and convection oven having a digital display and controls.

It is an object of the present invention to provide a toaster and convection oven having heating elements that are independently controllable.

According to an embodiment of the present invention, a toaster and convection oven is provided. The oven includes a housing having an internal heating compartment, a heating mechanism in thermal communication with the heating compartment and configured to heat the heating compartment, a user interface including a plurality of user controls to be manipulated by a user, the user controls allowing the user to program a dual cook mode including a first cooking mode and a second cooking mode, and a control unit operatively connected to the user interface and to the heating mechanism. The control unit is configured to receive a signal from the user interface and to control operation of the heating mechanism in dependence upon the signal to run the first cooking mode and the second cooking mode sequentially without further input from the user.

According to another embodiment of the present invention, a method of operating a toaster and convection oven having a heating compartment, a plurality of heating elements within the heating compartment and a user interface including a plurality of user control is provided. The method includes the steps of receiving a first cooking signal and a second cooking signal in response to actuation of the user controls, the first cooking signal corresponding to a first cooking function having a first cooking parameter and the second cooking signal corresponding to a second cooking function having a second cooking parameter, controlling the heating elements to perform the first cooking function, and controlling the heating elements to perform the second cooking function automatically, subsequent to performing the first cooking function and without further actuation of the user controls.

DETAILED DESCRIPTION OF THE PREFERRED EMBODIMENTS

Figure 1:
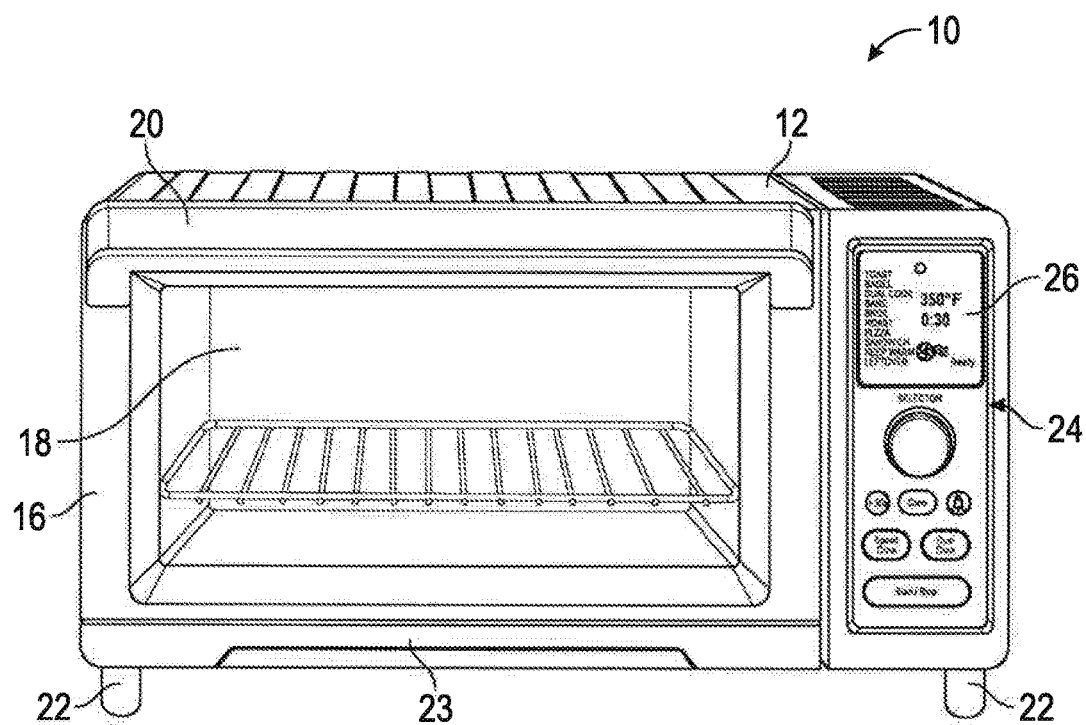
FIG. 1 is a perspective view of a toaster and convection oven in accordance with an embodiment of the present invention.

Referring to FIG. 1, a toaster and convection oven 10 according to an embodiment of the present invention, is shown. The oven 10 includes a thermally insulated housing 12 that defines an internal heating compartment 14. The compartment 14 may be accessed through a door 16 having a transparent front panel 18. In an embodiment, the door 16 is pivotally connected to the housing 12 at a lower edge thereof. As shown therein, the door 16 also has a handle 20 allowing a user to open the door 16 to provide access to the compartment 14. A plurality of feet 22 support the housing 12 in spaced relation to a countertop or other surface. The oven 10 also includes a crumb tray 23 slidably received by the housing 12 which can be pulled out from the front of the oven 10 for easy cleaning.

As further shown in FIG. 1, the front of the housing 12 includes a user interface in the form of a control panel 24 having a graphic display, herein shown as a liquid crystal display (LCD) 26, and an array of user controls, as discussed hereinafter.

Figure 2:
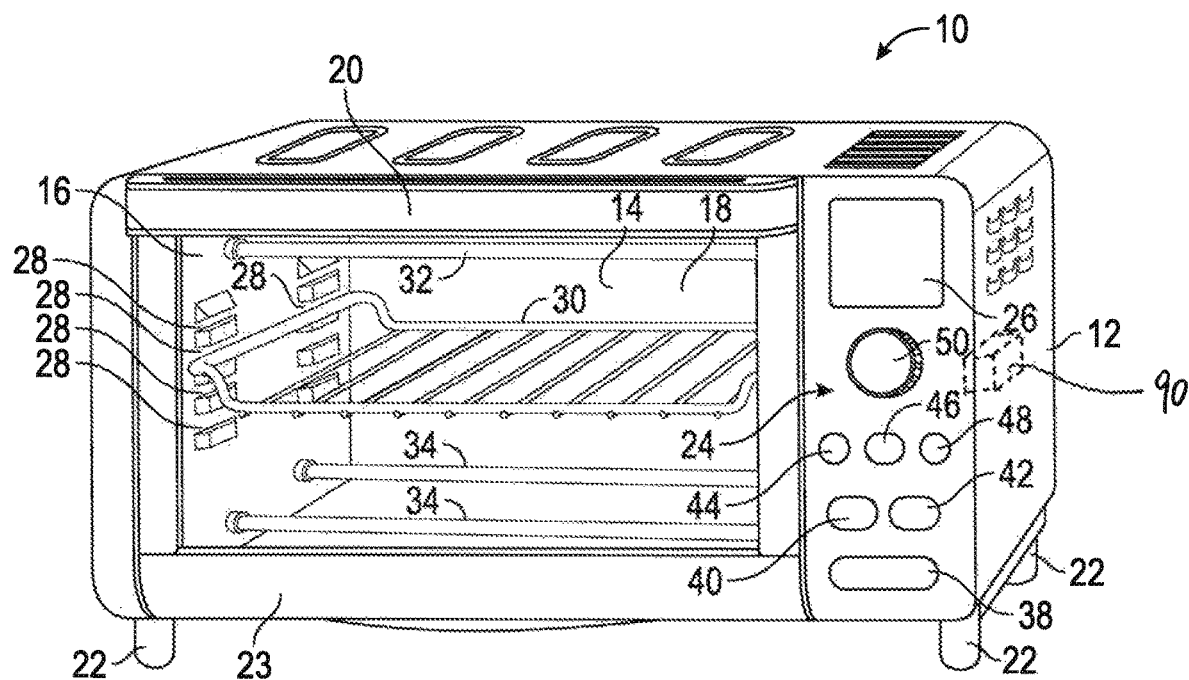
FIG. 2 is a perspective view of the toaster and convection oven of FIG. 1 illustrating internal components thereof.
Figure 3:
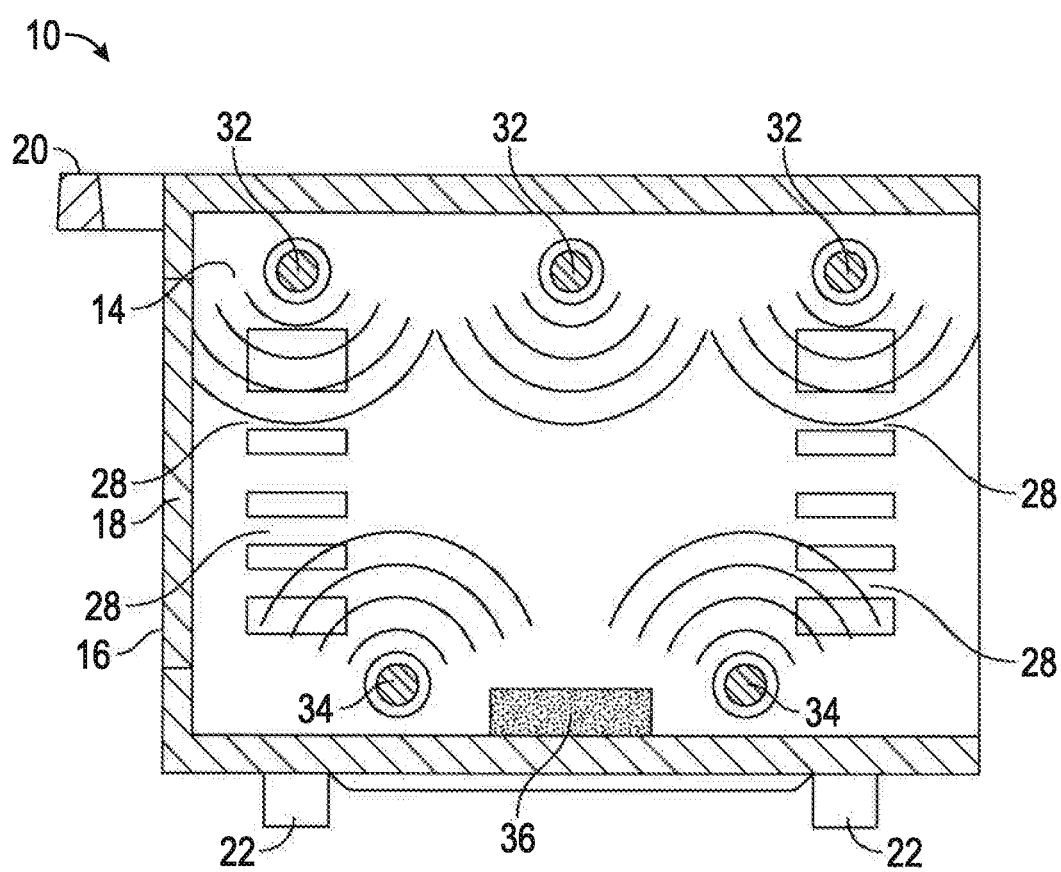
FIG. 3 is a schematic, side cross-section of the toaster and convection oven of FIG. 1.
Figure 4:
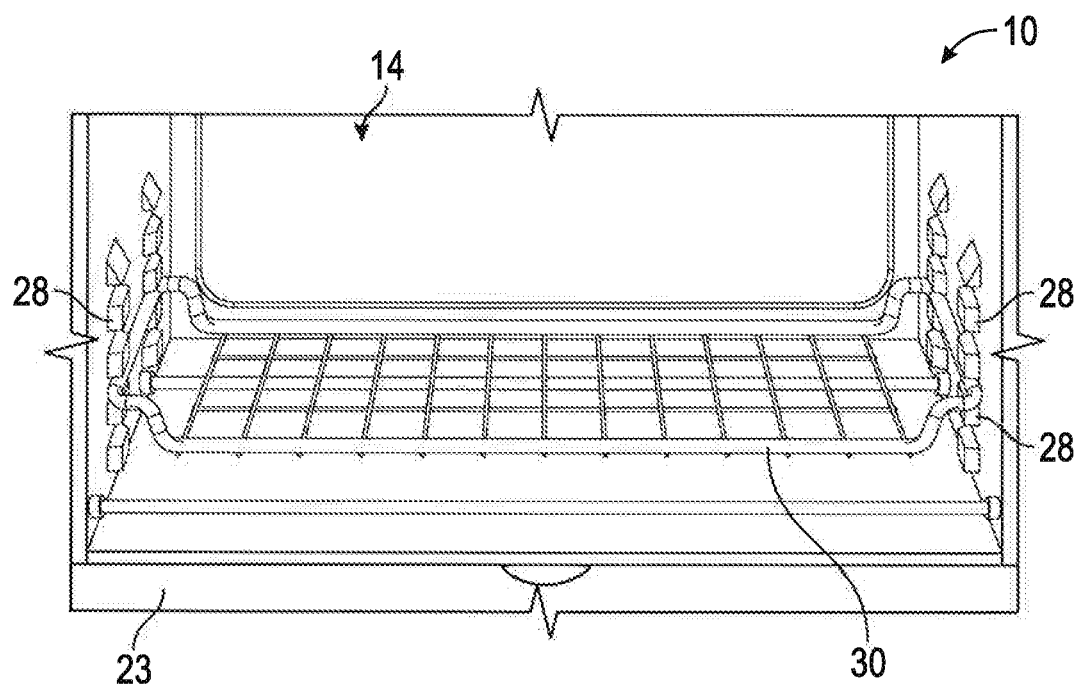
FIGS. 4-7 are perspective views of the toaster and convection oven of FIG. 1, illustrating various selectable oven rack positions.
Figure 5:
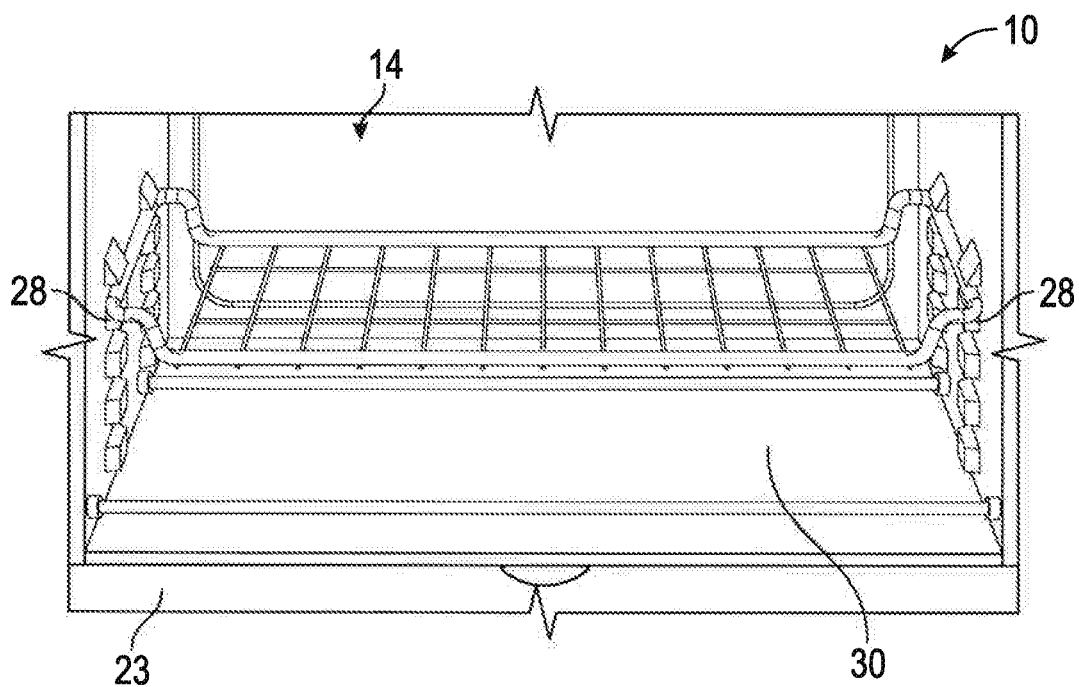
Figure 6:
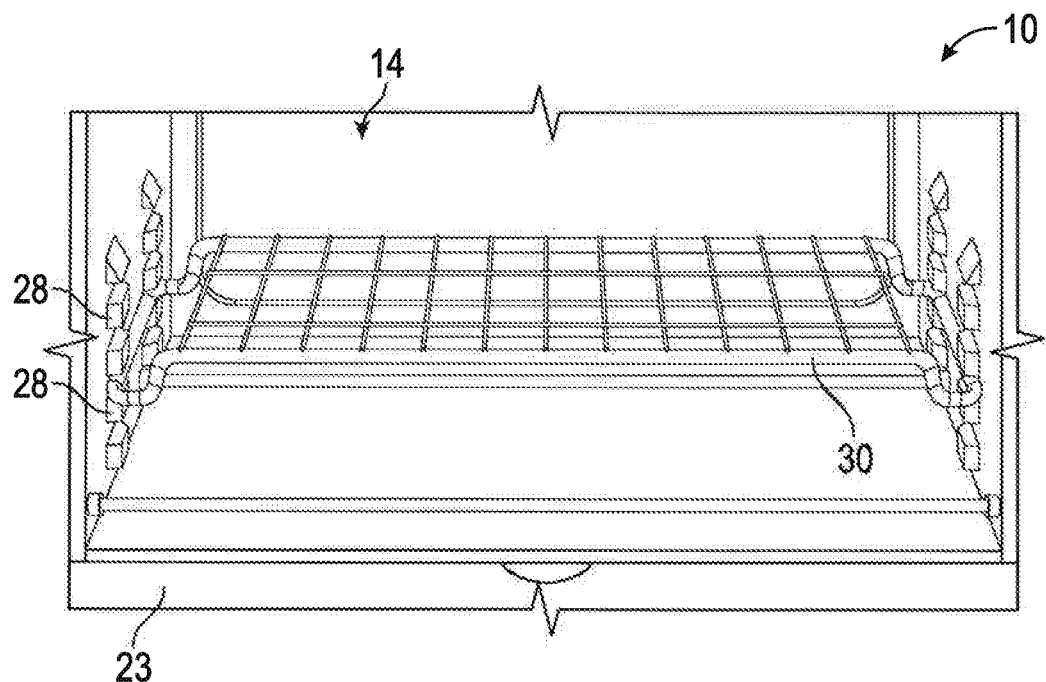
Figure 7:
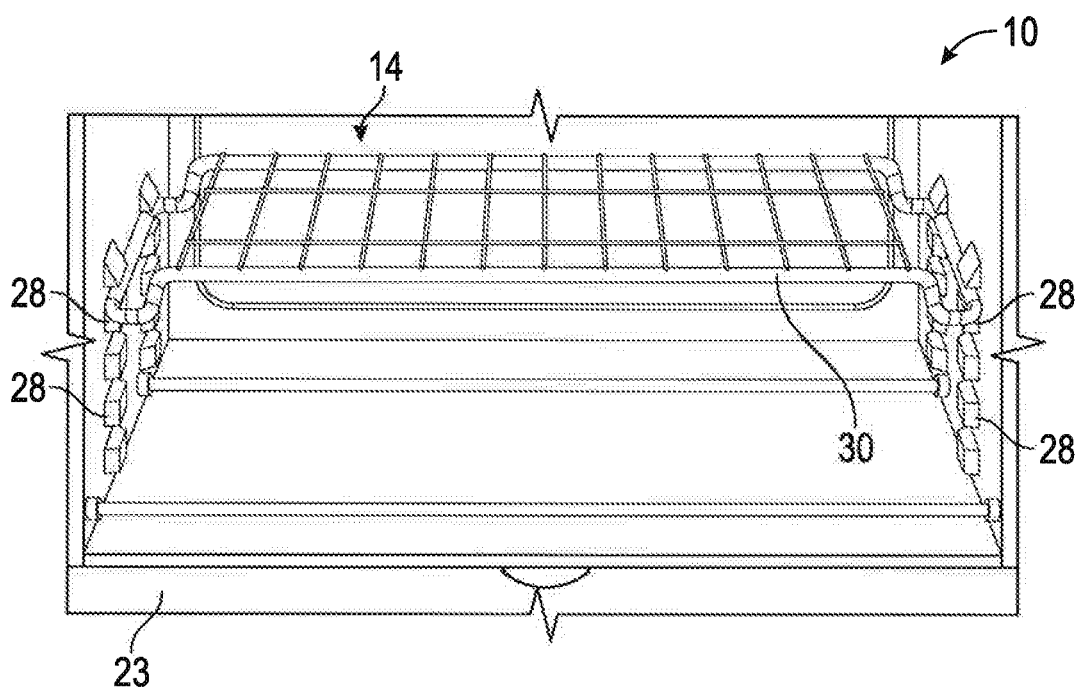

As best shown in FIGS. 2 and 3, the internal compartment 14 includes one or more pairs of opposed slots 28 for slidably receiving one or more removable racks 30. In the preferred embodiment, there are four pairs of opposed slots 28 corresponding to four positions to insert the racks 30 into the oven 10. FIGS. 4-7 illustrate the placement of a rack 30 at each of the four positions, with FIG. 4 illustrating the lowest position and FIG. 7 illustrating the highest position. In the preferred embodiment, the two upper positions (shown in FIGS. 6 and 7) contain position stops that prevent the racks 30 from being pulled more than halfway out of the oven 10. If a user desires to completely remove the rack 30, it can be removed by lifting up on the front of the rack 30 to disengage it from the position stops, and then sliding it out of the oven compartment 14.

Importantly, the interior walls of the compartment 14 are coated with a non-stick material. This inhibits the buildup of debris and the like within the compartment and provides for easier cleaning.

With further reference to FIG. 3, in the preferred embodiment, the internal compartment 14 is heated by five tubular heating elements 32, 34 configured to produce radiant heat. Three upper heating elements 32 are located adjacent to the ceiling or top of the compartment 14 and two lower heating elements 34 are located along the floor or bottom of the compartment 14. In an embodiment, the tubular heating elements 32, 34 are Calrod® heaters, such as stainless steel Calrod® heaters, although any other type of heating element known in the art, such as quartz, tungsten, halogen, etc., may also be utilized without departing from the broader aspects of the present invention. As shown in FIG. 3, the heating elements 32, 34 are shown producing radiant heat in reference to a food item (not shown) within heating compartment 14.

As also shown in FIG. 3, the oven 10 also includes a fan 36 which functions to circulate heated air within the compartment 14 and around a food item as it cooks. In this manner, the oven provides for convection heating of food items, as discussed in detail hereinafter. While FIG. 3 shows the fan 36 positioned adjacent to the floor of the compartment 14, the fan 36 may be positioned anywhere within the compartment 14 sufficient to circulate air around a food item.

With further reference to FIG. 2, the user interface 24 is electrically connected to, and configured to control, operation of the heating elements 32, 34 and the convection fan 36. In particular, the user interface 24 includes a control unit/microprocessor (not shown) and control circuitry configured to control the heating elements 32, 34 and fan 36 in dependence upon one or more user inputs, and according to control algorithms stored in memory. Importantly, the upper and lower heating elements 32, 34 are independently controllable by the microprocessor and control circuitry. In particular, both the three upper and two lower heating elements 32, 34 may be selectively operated at zero wattage (OFF), full wattage or a selected wattage between zero and full wattage. For example, one or both of the heating elements 32, 34 may be operated at half wattage.

In other embodiments, any number or all of the heating elements 32, 34 may be operated at a wattage between zero watts and full wattage for a first portion of a cooking/heating cycle, and at another, different wattage for a second portion of a cooking/heating cycle, as discussed in detail below.

Figure 8:
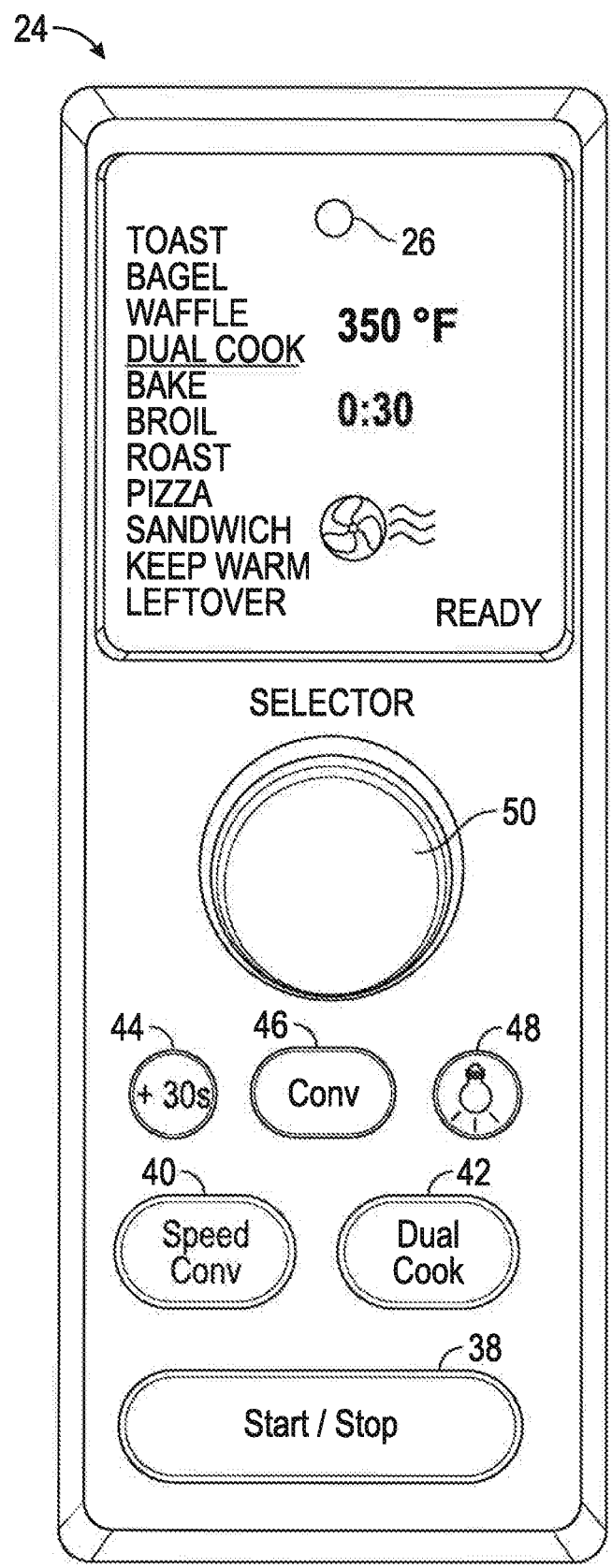
FIG. 8 is a enlarged, detail view of a control panel of the toaster and convection oven of FIG. 1.

FIG. 8 illustrates the user interface 24 that may be utilized by a user to select one or more cooking functions, cooking time, cooking temperature and the like (i.e., user inputs). As shown therein, the user interface 24 includes the LCD display 26, a plurality of depressible buttons including a start/stop button 38, a speed convection button 40, a dual cook button 42, an 'add time' button 44, a convection button 46, and an oven light button 48, and a rotatable and depressible selector knob 50. The display 26 is preferable a blue-backlit LCD screen that displays the function, time, temperature, and toast shade selected by a user, and includes PREHEATING and READY readouts. When the oven is not in use, the display 26 is configured to display a clock.

With further reference to FIG. 8, the selector knob 50 is rotatable by a user to select a cooking function. For example, cooking functions may include toast, bagel, waffle, dual cook, bake, broil, roast, pizza, sandwich, keep warm and leftover. These cooking functions corresponding to predetermined cooking routines stored in memory. The selector knob 50 is also configured to selectively change a preset time or temperature, and to choose toast shade. The knob 50 may be rotated to scroll through cooking function, time and temperature and is pressed to select the desired operation. In addition, the knob 50 is operable to set the clock time.

The 'add time' button 44 allows a user to automatically add 30 seconds to any function by depressing the button 44 during toasting or cooking. The convection button 46 may be pressed at any time to activate the convection fan 36 to add convection cooking to any of the preselected cooking functions. As will be readily appreciated, convection provides faster and more even baking and cooking than cooking by radiant heat alone. The speed convection button 40, alternatively, provides even faster cooking by activating the fan 36 without preheating.

The oven 10 also includes an internal light (not shown) that is configured to automatically turn on when the door 16 is opened. In an embodiment, the control unit 90 of the user interface is configured to detect when the oven door 16 is opened, and to automatically turn on the oven light for two minutes. In addition, oven light button 48 may be pressed by the user to selectively turn the light on or off, as desired. In the event that a user turns on the light by pressing button 48 but does not turn it off, the control unit 90 is configured to turn the light off after two minutes.

Still referring to FIG. 8, the dual cook button 42 allows a user to combine two different cooking functions or two different temperatures within one cooking function, thereby providing maximum flexibility and customization of a cooking operation. Finally, a the start/stop button 38 ay be pressed to start the cooking operation after a cooking function/mode, temperature and time has been selected, and to stop the cooking process at any time, as desired.

With further reference to FIGS. 1-8 operation of the oven 10 in various cooking modes will now be described. To select TOAST mode, a user rotates the selector knob 50 until TOAST is highlighted on the display 26 and presses the knob 50 to select the mode. TOAST SHADE will then flash on the display 26, and a user may again scroll and through and select a desired toast shade, from 1 to 7, by utilizing the knob 50. The display will then prompt the user to select the number of slices to be toasted by flashing the word "SLICES." Again, a user may scroll and select using the knob 50. Finally, a snowflake icon will flash on the display 26. A user may then rotate the dial to select if the bread to be toasted is frozen, otherwise a user may press start/stop button 38 to begin toasting. Importantly, if the toast is too light, 30 seconds of toasting time may be added by depressing the add time button 44.

To select BAGEL mode, a user rotates the selector knob 50 until BAGEL is highlighted on the display 26 and presses the knob 50 to select the mode. TOAST SHADE will then flash on the display 26, and a user may again scroll and through and select a desired toast shade, from 1 to 7, by utilizing the knob 50. The display will then prompt the user to select the number of halves/slices to be toasted by flashing the word "SLICES." Again, a user may scroll and select using the knob 50. Finally, a snowflake icon will flash on the display 26. A user may then rotate the dial to select if the bagel is frozen, otherwise a user may press start/stop button 38 to begin toasting. In the BAGEL mode, the control unit controls the heating elements 32, 34 to provide full heat on the top and half on the bottom. If the bagels are not toasted to a desired shade, 30 seconds of toasting time may be added by depressing the add time button 44.

To select WAFFLE mode, a user rotates the selector knob 50 until WAFFLE is highlighted on the display 26 and presses the knob 50 to select the mode. TOAST SHADE will then flash on the display 26, and a user may again scroll and through and select a desired toast shade, from 1 to 7, by utilizing the knob 50. The display will then prompt the user to select the number of waffles to be toasted by flashing the word "SLICES." Again, a user may scroll and select using the knob 50. Finally, a snowflake icon will flash on the display 26. A user may then rotate the dial to select if the waffle is frozen, otherwise a user may press start/stop button 38 to begin toasting. If the waffles are not toasted to a desired shade, 30 seconds of toasting time may be added by depressing the add time button 44.

To select BAKE mode, a user turns the selector knob 50 and depresses it to select BAKE. A temperature readout will flash and a user may then rotate the selector knob 50 once again until the desired temperature is displayed, and then set the temperature by depressing the knob 50. A time readout will then flash and a user can select the baking time using the knob 50. Notably, convection or speed convection can be selected at any time before or after pressing the start/stop button 38. If speed convection is selected by depressing speed convection button 40, the food can be added to the oven and the start/stop button 38 pressed to initiate cooking. If bake or convection bake is selected, pressing the stop/start button 38 will initiate preheating and the display 26 will show PREHEATING. The control unit is configured to generate an audible beep when the set temperature is reach, thereby prompting a user to add food to the oven 10 and initiate baking. A timer on the display 26 will begin counting down, and an audible beep is generated when the cooking time has expired. In addition, once cooking time expires, the control unit will also automatically control the heating elements 32, 34 and the fan 36 to their off positions.

The selection of the operation in BROIL or ROAST modes is substantially similar to the selection and operation in BAKE mode, as described above. Notably, the top center heater 32 is only activated during the BROIL mode, and is not utilized in any other cooking mode.

To select PIZZA mode, a user inserts a pizza stone sized for the oven 10 onto one of the racks 30 and inserts the rack 30 into the compartment. The selector knob 50 is then turned to PIZZA and depressed. A temperature readout will flash and a user may then rotate the selector knob 50 once again until the desired temperature is displayed, and then set the temperature by depressing the knob 50. Pizza size will then begin to flash, and knob 50 may be utilized to select pizza size. A time readout will then flash and a user can select the cooking time using the knob 50. If the pizza to be cooked is fresh, the dial 50 may be rotated to hide the snowflake icon, or otherwise turned to display the snowflake icon for frozen pizza. When fresh pizza is selected (snowflake not displayed), the control unit is configured to preheat the oven. Once the oven 10 is up to temperature, the pizza may be inserted into the compartment and the start/stop button 38 depressed to initiate cooking. The timer will then begin counting down and an audible beep will be generated upon expiration of the timer. Once cooking time expires, the control unit will automatically control the heating elements 32, 34 to their off positions.

To select SANDWICH mode, a user turns the selector knob 50 and depresses it to select SANDWICH. A temperature readout will flash and a user may then rotate the selector knob 50 once again until the desired temperature is displayed, and then set the temperature by depressing the knob 50. A time readout will then flash and a user can select the heating time using the knob 50. The start/stop button 38 is then depressed to initiate cooking/heating. Once the start/stop button 38 is depressed, a timer on the display 26 will begin counting down, and an audible beep is generated when the cooking time has expired. In addition, once cooking time expires, the control unit will also automatically control the heating elements 32, 34 to their off positions. In SANDWICH mode, the control unit controls the upper heating elements 32 to operate at half power to melt cheese or the like (for open-faced sandwiches) and the bottom heating elements 34 to operate at full power (to crisp the bread).

To select KEEP WARM mode, a user turns the selector knob 50 and depresses it to select KEEP WARM. A temperature readout will flash and a user may then rotate the selector knob 50 once again until the desired temperature is displayed, and then set the temperature by depressing the knob 50. A time readout will then flash and a user can select the heating time using the knob 50. The start/stop button 38 is then depressed to initiate heating. Once the start/stop button 38 is depressed, a timer on the display 26 will begin counting down, and an audible beep is generated when the cooking time has expired. In addition, once cooking time expires, the control unit will also automatically control the heating elements 32, 34 to their off positions.

To select LEFTOVER mode, a user turns the selector knob 50 and depresses it to select LEFTOVER. A temperature readout will flash and a user may then rotate the selector knob 50 once again until the desired temperature is displayed, and then set the temperature by depressing the knob 50. A time readout will then flash and a user can select the heating time using the knob 50. The start/stop button 38 is then depressed to initiate heating. Once the start/stop button 38 is depressed, a timer on the display 26 will begin counting down, and an audible beep is generated when the cooking time has expired. In addition, once cooking time expires, the control unit will also automatically control the heating elements 32, 34 to their off positions.

As indicated above, the oven 10 of the present invention is configured to cook food items, in part, by convection. In a convection mode, fan 36 is activated to circulated heated air around a food item as it cooks. Utilizing convection allows for faster cooking times and more even cooking. Convection cooking may be selected with any cooking function, including BAKE, BROIL, ROAST, PIZZA, SANDWICH, KEEP WARM or LEFTOVER by first selecting the cooking mode, setting the oven temperature and timer, and then pressing the convection button 46. Depressing the convection button 46 prompts the control unit to activate the convection fan 36, and the display 26 displays a fan icon. Convection may be initiated at any time as the function is being set, during preheating, or during cooking. In addition, convection may be turned off at any time by depressing the convection button 46 once again.

Speed convection allows food to be cooked even faster than convection cooking and is specially adapted to be used with frozen entrees and when roasting vegetables and meets. Speed convection may be selected with any cooking function by depressing speed convection button 40. Depressing the speed convection button 40 prompts the control unit to activate the convection fan 36 at a higher rate than regular convection, and the display 26 displays a speed convection fan icon. Notably, when speed convection is selected, no preheating is required and the timer will begin to count down as soon as the start/stop button 38 is pressed.

As alluded to above, the oven 10 of the present invention also includes a DUAL COOK mode. DUAL COOK mode allows a user to combine any two cooking function and run them consecutively. In particular, DUAL COOK mode allows a user to program separate cooking temperatures and times for two different functions to run consecutively, or to program two different cooking temperatures and times within the same function. In an embodiment, DUAL COOK mode can be programmed using BAKE, BROIL, ROAST, PIZZA, SANDWICH and KEEP WARM functions.

In use, a user can select DUAL COOK mode by pressing the dual cook button 42. The oven 10 will then display the functions that a user may select for the first cooking cycle on display 26. A user can then use the knob 50 to select the first function: BAKE, BROIL, ROAST, PIZZA, SANDWICH or KEEP WARM. The cooking temperature and time for the first function is then set by the user in the manner discussed above. The display 26 will then display the functions that a user may select for the second cooking cycle. A user can again use the knob 50 select the second function, as well as the cooking temperature and time for the second function. For example, if BAKE is selected for the first function, BAKE, BROIL and KEEP WARM may be displayed as options for the second function. The oven 10 may then enter a PREHEAT mode (if the first function selected is BAKE). Once the oven 10 is ready, the start/stop button 38 may be pressed to initiated the cycle.

In operation in DUAL COOK mode, the oven 10 will run through the first cooking function for the set time, at the set temperature. When the first cooking function is finished, the control unit will generate and audible beep and automatically switch to the second cooking function for the set time. When the timer reaches zero on the second function, the control unit will again generate an audible beep, the display will turn white, and the heating elements will be turned off. Alternatively, cooking may be stopped at any time by pressing the start/stop button 38. Notably, when the oven 10 is running in the first function, a user may check the settings of the second function by pushing the dual cook button 42.

As will be readily appreciated, DUAL COOK mode is particularly suited for dishes like casseroles which are baked and then browned on broil or meats which are first roasted at a high temperature and then reduced. For example, DUAL COOK mode can be used to BAKE then BROIL (to brown the top of a food item), to bake at a high temperature for a period of time and then at a lower temperature to achieve fork-tender meats with crisp exteriors, or to keep food items warm at an optimal serving temperature after they are baked (e.g., bake food items then keep warm).

In connection with the above, the user interface 24 and control unit of the oven 10 are also configured to allow a user to change functions, time or temperature mid cycle during cooking. For example, to change temperature, a user may press and hold the knob 50 until a beep sounds and the display 26 flashes the previously selected temperature. The knob 50 may then be utilized to set a new temperature. Upon selection of the new temperature, the control unit will generate an audible beep to indicate to a user that the change was effected.

Similarly, to change cooking time, a user may press and hold the knob 50 until the set temperature begins flashing. The knob 50 is then pressed again until the countdown timer begins flashing and the current remaining time is displayed. The knob 50 may then be utilized to set a new time. Upon selection of the new time, new countdown time will be displayed and the cooking process will continue.

Lastly, to change cooking function/mode, a user may press the stop/start button 38 and then utilize knob 50 to select a new function, including a new cook temperature and cook time.

the control unit will generate an audible beep to indicate to a user that the change was effected.

As noted above, the toaster oven 10 of the present invention may be operated using both preset and user-adjustable temperature and cook times. In the preset modes, the toaster oven 10 is pre-programmed to deliver power to the heating elements 32, 34 in dependence upon the type of food being heated and according to a preset control algorithm stored in memory (controlling the wattage and on/off state for each heating element 32, 34).

As will be readily appreciated, customized control over the cooking cycle (in terms of temperature, time and function(s)) allows a user to more precisely tailor a cooking/heating cycle to the type of food item placed within the heating compartment 14, resulting in better tasting and looking food. In addition, such customizable control allows the toaster over 10 to be utilized to heat or cook food items that would normally not be well suited to cooking in conventional toaster ovens.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A toaster and convection oven, comprising:
   a housing having an internal compartment;
   a heating mechanism in thermal communication with said compartment and configured to heat said compartment;
   a user interface including a plurality of user controls to be manipulated by a user, said user controls configured to allow independent selection of a first and a second cooking mode as part of a dual mode cooking method;
   a control unit operatively connected to said user interface and to said heating mechanism, said control unit being configured to receive a signal generated by said user interface and to control operation of said heating mechanism in dependence upon said signal, thereby executing said first cooking mode and said second cooking mode sequentially without further input from said user;
   a display unit in communication with said control unit, said display unit selectively displaying parameters of said first and said second cooking modes;
   said heating mechanism includes at least one upper heating element adjacent to a top of said heating compartment, said at least one upper heating element being operable at a first wattage between zero and full power, and at least one lower heating element adjacent to a bottom of said heating compartment, said at least one lower heating element being operable at a second wattage between zero power and full power;
   wherein said control unit and said user interface are configured such that operation of said user interface selectively controls said display unit to display said parameters of said second cooking mode while said toaster and convection oven is operating in said first cooking mode;
   wherein said control unit and said user interface are configured to allow a user to change at least one parameter of the second cooking mode while the toaster and convection oven is operating in the first cooking mode;
   wherein said display unit displays a plurality of cooking functions for said first cooking mode and said second cooking mode for selection and execution, said plurality of cooking functions including at least toast, bagel, waffle, dual cook, bake, broil, roast, pizza, sandwich, keep warm and leftover functions; and wherein the display unit is configured to flash an indicator to prompt a user to select a frozen or not frozen condition of a food item in dependence upon the cooking function selected.

2. The toaster and convection oven of claim 1, wherein:
said first cooking mode includes a first cooking function, a first cooking temperature and a first cooking time; and
said second cooking mode includes a second cooking function, a second cooking temperature and a second cooking time;
wherein at least said first cooking temperature is different from said second cooking temperature.

3. The toaster and convection oven of claim 2, wherein:
said first cooking function is bake; and
said second cooking function is broil.

4. The toaster and convection oven of claim 2, further comprising:
a convection fan in communication with said heating compartment and configured to circulate air around the food item within said heating compartment.

5. The toaster and convection oven of claim 4, wherein:
said plurality of user controls include a start/stop button for initiating a cooking cycle, a dual cook button for initializing said dual cook mode and an oven light button for turning on and off a light within said heating compartment.

6. The toaster and convection oven of claim 4, wherein:
said plurality of user controls include a convection button for controlling said convection fan to a first speed and a speed convection button for controlling said convection fan to a second speed;
wherein said second speed is greater than said first speed.

7. The toaster and convection oven of claim 4, wherein:
said plurality of user controls includes a rotatable and depressible selector knob for selecting said first cooking function, said first cooking time and said first cooking temperature, and said second cooking function, said second cooking time, and said second cooking temperature.

8. The toaster and convection oven of claim 4, wherein:
said plurality of user controls includes an add time button operable to automatically add 30 seconds to either said first cooking function or said second cooking function.

9. The toaster and convection oven of claim 1, wherein:
said at least one upper heating element is three upper heating elements; and
said at least one lower heating element is two lower heating elements.

10. The toaster and convection oven of claim 1, wherein:
the control unit and user interface are further configured such that a function, a time and/or a temperature can be selectively changed during operation of the toaster and convection oven in at least one of said first and second cooking modes upon input from the user using the user interface.

11. A cooking appliance, comprising:
a housing having an internal compartment;
a heating mechanism in thermal communication with said compartment and configured to heat said compartment, said heating mechanism includes at least one electric heating element;
a user interface including a plurality of user controls to be manipulated by a user, said user controls configured to allow independent selection of a first and a second cooking mode as part of a dual mode cooking method;
a control unit operatively connected to said user interface and to said heating mechanism, said control unit being configured to receive a signal generated by said user interface and to control operation of said heating mechanism in dependence upon said signal;
a display unit in communication with said control unit, said display unit selectively displaying parameters of said first and said second cooking modes;
wherein said control unit and said user interface are configured such that operation of said user interface selectively controls said display unit to display said parameters of one of said first and said second cooking modes during operation of said cooking appliance in the other of said first and said second cooking modes;
wherein said control unit is configured such that, in said dual mode and after selection of the first cooking mode, said control unit controls said display unit to display a subset of all cooking modes executable by said cooking appliance for selection by a user for said second cooking mode; and
wherein said subset of all cooking modes displayed by the display unit after selection of the first cooking mode is dependent upon the particular first cooking mode selected;
wherein said control unit and said user interface are configured to allow a user to change at least one parameter of the second cooking mode while the cooking appliance is operating in the first cooking mode;
wherein depending on a type of a food item selected by a user using said user interface, said control unit controls the display unit to flash an icon, prompting a user to indicate a frozen or not frozen condition of said food item.

12. The cooking appliance of claim 11, wherein:
the user interface is configured to allow a user to select a quantity of the food item to be cooked.

13. A toaster and convection oven, comprising:
a housing having an internal compartment;
a heating mechanism in thermal communication with said compartment and configured to heat said compartment;
a user interface including a plurality of user controls to be manipulated by a user, said user controls configured to allow independent selection of a first and a second cooking mode as part of a dual mode cooking method;
a control unit operatively connected to said user interface and to said heating mechanism, said control unit being configured to receive a signal generated by said user interface and to control operation of said heating mechanism in dependence upon said signal, thereby executing said first cooking mode and said second cooking mode sequentially without further input from said user;
a display unit in communication with said control unit, said display unit selectively displaying parameters of said first and said second cooking modes;
said heating mechanism includes at least one upper heating element adjacent to a top of said heating compartment, said at least one upper heating element being operable at a first wattage between zero and full power, and at least one lower heating element adjacent to a bottom of said heating compartment, said at least one lower heating element being operable at a second wattage between zero power and full power;
wherein said control unit and said user interface are configured such that operation of said user interface selectively controls said display unit to display said parameters of said second cooking mode while said toaster and convection oven is operating in said first cooking mode;

wherein said control unit and said user interface are configured such that when the toaster and convection oven is executing said first cooking mode of said dual mode cooking method, said control unit and said user interface allow a user to change said second cooking mode from a first selected preprogrammed cooking function, to a second, different preprogrammed cooking function; and wherein said first cooking mode includes a first cooking function including one of bagel, waffle and pizza cooking functions;

wherein said display unit is configured to flash an indicator to prompt a user to select a frozen or not frozen condition if one of said bagel, said waffle or said pizza cooking function is selected; and wherein said user interface provides for user indication of said frozen or not frozen condition of said bagel, said waffle or said pizza if said bagel, waffle or pizza cooking function is selected.

* * * * *